United States Patent

[11] 3,603,761

[72] Inventor Alfred Wogerbauer
  Linz, Austria
[21] Appl. No. 1,105
[22] Filed Jan. 7, 1970
[23] Division of Ser. No. 651,836, July 7, 1967, Pat. No. 3,545,496
[45] Patented Sept. 7, 1971
[73] Assignee Vereinigte Osterreichische Eisen-und Stahlwerke Aktiengesellschaft
  Linz, Austria
[32] Priority Aug. 9, 1966
[33] Austria
[31] A-7605/66

[54] APPARATUS FOR PRODUCING FOLD FLANGE TUBES
  3 Claims, 16 Drawing Figs.
[52] U.S. Cl. ............................................. 219/59, 219/102
[51] Int. Cl. ............................................. B23k 11/02
[50] Field of Search ............................................. 219/59, 64, 67, 101, 102, 107; 72/181

[56] References Cited
UNITED STATES PATENTS

| | | | |
|---|---|---|---|
| 1,257,298 | 2/1918 | Neuman ...................... | 72/181 |
| 1,806,558 | 5/1931 | Holmes ...................... | 219/67 |
| 2,251,967 | 8/1941 | Yoder ...................... | 72/181 |
| 2,821,619 | 1/1958 | Rudd ...................... | 219/107 |
| 2,950,376 | 8/1960 | Wogerbauer ................. | 219/59 X |
| 3,132,234 | 5/1964 | Wogerbauer ................. | 219/59 X |
| 3,165,815 | 1/1965 | Wogerbauer ................. | 219/146 X |
| 3,263,053 | 7/1966 | Rudd ...................... | 219/59 |
| 3,420,976 | 1/1969 | Morris et al. .............. | 219/59 X |

Primary Examiner—J. V. Truhe
Assistant Examiner—L. A. Schutzman
Attorney—Brumbaugh, Graves, Donohue & Raymond ABSTRACT: The invention comprises an apparatus for producing fold flange tubes, in particular such having complicated cross-sectional shapes, in a continuous manner and with a minimum of tooling equipment, wherein two series of shape rolling stands arranged in staggered relationship in a vertical plane for the formation of component sections, a device for vertically approaching the component sections so formed, and a welding machine for joining the component sections are provided.

PATENTED SEP 7 1971

INVENTOR
ALFRED WÖGERBAUER

BY
his ATTORNEYS

PATENTED SEP 7 1971 3,603,761

INVENTOR
ALFRED WÖGERBAUER

BY
his ATTORNEYS.

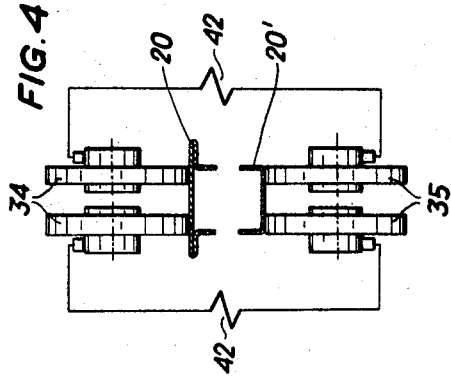
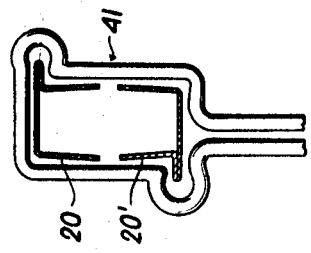
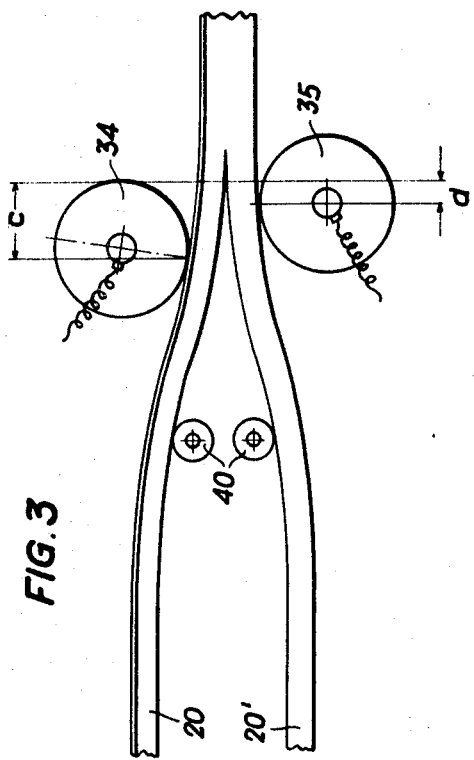
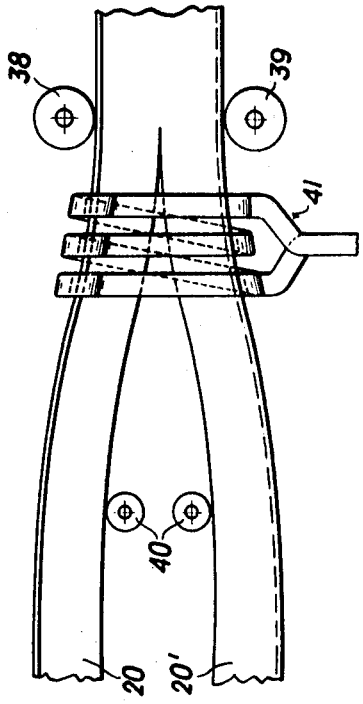
INVENTOR
ALFRED WÖGERBAUER

APPARATUS FOR PRODUCING FOLD FLANGE TUBES

This application is a division of my pending application Ser. No. 651,836, filed July 7, 1967, now Pat. No. 3,545,496, issued Dec. 8, 1970.

The invention relates to an apparatus for producing fold flange tubes from metal strips.

Fold flange or lap tubes are increasingly used by building fitters, in portal building, and the like, for making doors, windows, frames, etc. Originally, fold flange tubes were exclusively produced by reshaping round tubes upon draw benches. This type of production is expensive, as it requires many separate steps and a considerable amount of material. Further, fold flange tubes are also produced in tube welding plants where preshaped tubes are made, which thereafter receive their respective shapes by a final cold-draw on draw benches. Fold flange tubes so produced are expensive, as multiple-stand tube welding machines and complicated tooling equipment are required. With increasingly complicated shapes of the tubes this mode of production becomes ever less economical. The limit is apparently a maximum of three fold flanges.

The invention aims at avoiding these disadvantages and difficulties. In particular, it has as its object to provide a simple apparatus enabling the production of fold flange tubes from strip stock in a continuous manner.

A further object is to keep the assembly equipment at a minimum even when fold flange tubes of highly complicated cross-sectional shapes are produced, i.e. such having four to eight fold flanges.

The apparatus of the invention with which these objects are achieved comprises two series of shape rolling stands of which each is adapted to shape continuously fed strip stock to one component section, both component sections having projecting edges and at least one of them having at least one fold flange, the two series of shape rolling stands being arranged in staggered relationship in a vertical plane. Following the second series of said shape rolling stands there is provided a device for bringing together the edges of the two component sections so formed, which device is adapted to vertically approach said component sections. The apparatus of the invention further includes a welding machine for butt-welding the facing edges of the component sections. The apparatus of the invention is particularly suited for the production of fold flange tubes having relatively complicated profiles with several fold flanges.

The welding machine used in accordance with the invention may be a low frequency welding machine with conductive current supply by way of electrode rollers staggered in feed direction and adjustable in relation to each other.

According to another embodiment the welding machine included in the apparatus of the invention is a high frequency welding machine with conductive current supply by way of sliding contacts adapted to be applied to the facing edges of the two component sections.

The invention is illustrated in more detail in the accompanying drawing.

FIGS. 3 and 4 illustrate a device for conductive welding,

Figure 6:
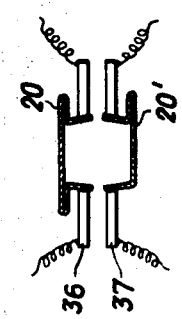
Figure 5:
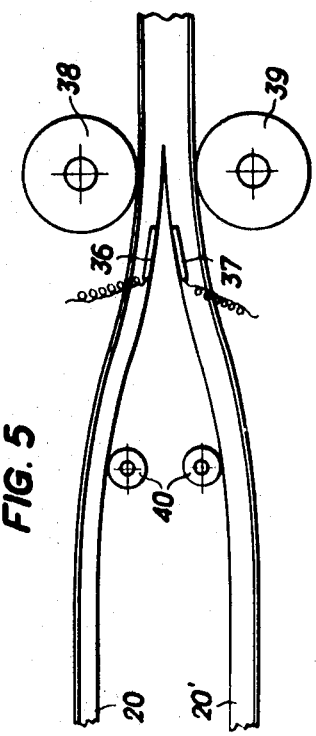

FIGS. 5 and 6 another embodiment of a device for conductive welding,

FIGS. 7 and 8 a device for inductive welding of component sections.

Figure 1:
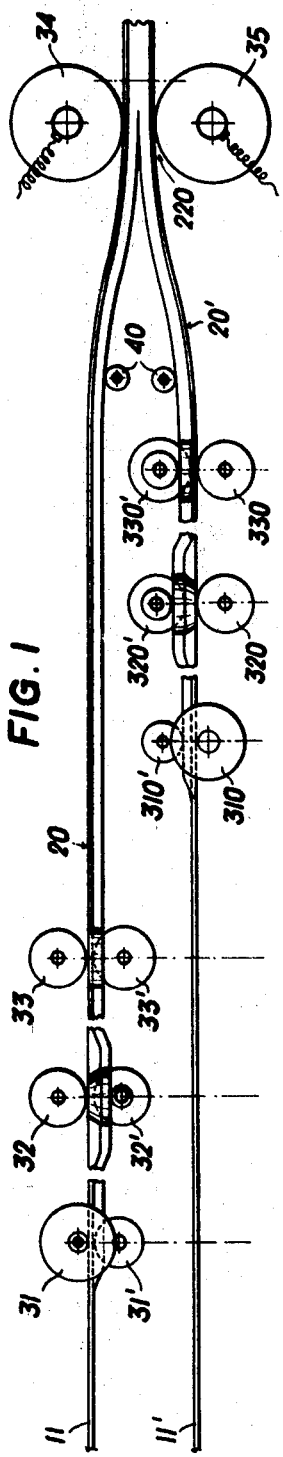
FIG. 1 is a diagrammatical view of the apparatus according to the invention.
Figure 1A:
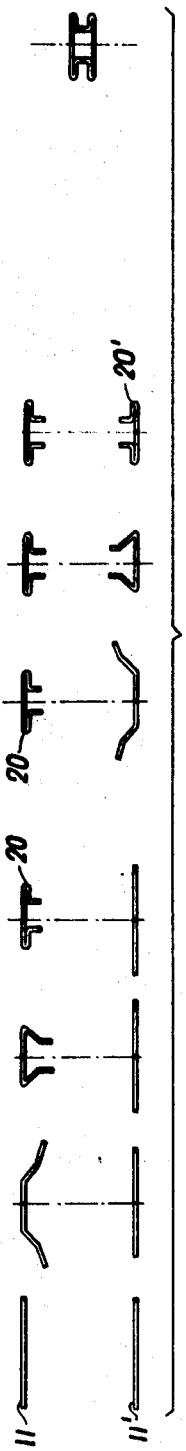
FIG. 1a illustrates the cross-sectional changes in the component sections of one form of tube which may be produced with the apparatus of FIG. 1.

FIG. 1 diagrammatically illustrates the apparatus according to the invention in which two series of shape rolling stands comprising pairs of *rolls are arranged in staggered relationship and at different levels in the vertical plane. Strip 11 enters the first series of shape rolling stands, three of which, 31, 31', 32, 32', and 33, 33', are shown, wherein strip 11 is shaped as shown in FIG. 1a, while strip 11' remains unshaped. In the second series of shape rolling stands arranged behind and below the first series, whereof again three roll pairs are designated by 310, 310', 320, 320', and 330, 330', the section 20 remains undeformed, as shown in FIG. 1a, while the strip 11' is shaped to section 20'. Thereafter the sections are brought together vertically until the branch edges to be welded come into facing contact with each other, and are then welded in welding machine 220. Numerals 34 and 35 denote electrode rollers, numeral 40 straddling rollers.

Figure 2A:
FIGS. 2a–2h illustrate the production of a component section in successive shaping stations of a series of shape rolling stands.
Figure 2B:
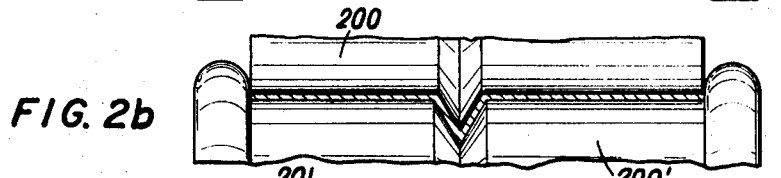
Figure 2C:
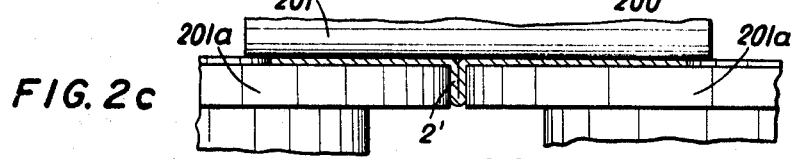
Figure 2D:
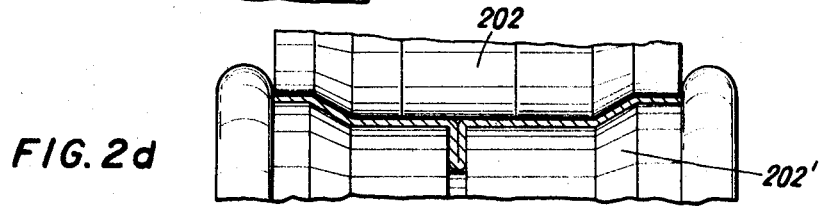
Figure 2E:
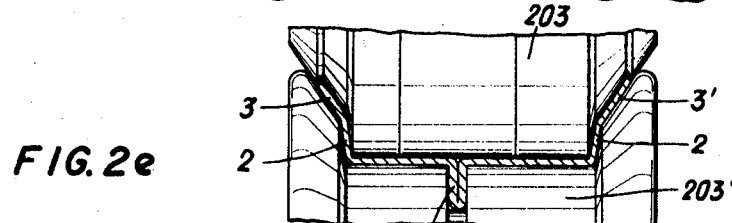
Figure 2F:
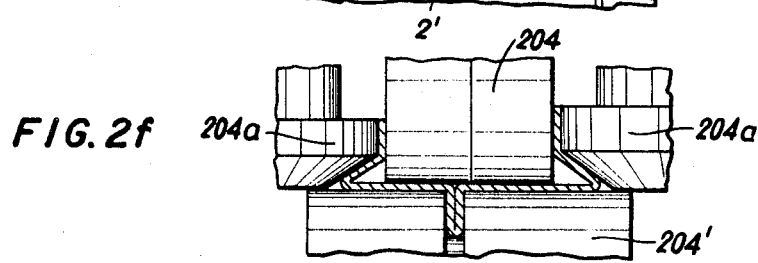
Figure 2G:
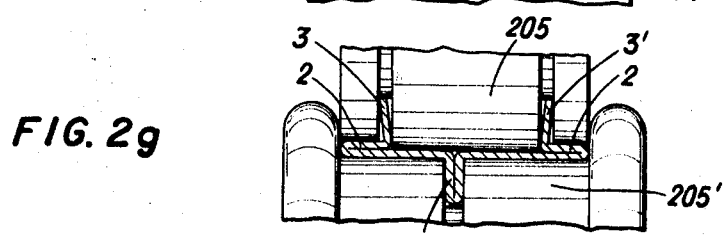
Figure 2H:
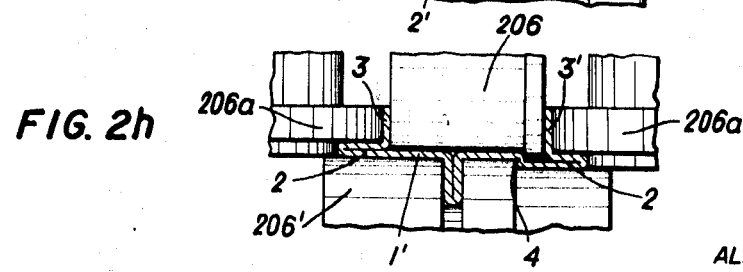

FIGS. 2a–2h illustrate the production of a component section in successive shaping stations of a series of shape rolling stands. The cross-sectional shape of the finished component section shown in FIG. 2 differs somewhat from those of FIG. 1a and serves as an example of the wide range of shapes that can be produced with the apparatus of the invention. FIG. 2a shows a flat strip 11 between two guide pulleys 110 and 110'; in FIG. 2b a bead longitudinal of the direction of the strip is shaped by means of two shaping rolls 200, 200' and in FIG. 2c is rolled by means of two shaping rolls 201a to form a flat flange 2', while a further, smooth roll prevents warping of the shaped strip. In FIG. 2d and 2e, the side flanges 2 and branches 3, 3' are preshaped by further shaping rolls 202, 202', and 203, 203'. In FIG. 2f and 2g, the flanges 2 and branches 3, 3' receive their final shape through rolls 204, 204', 205, 205', and the pair of rolls 204a. In FIG. 2h, the step 4 in web 1' is formed by the rolls 206, 206', and the pair of rolls 206a.

FIGS. 3 and 4 illustrate a possible welding current supply, FIGS. 5 and 6 another possibility and FIGS. 7 and 8 a third possibility. According to FIGS. 3 and 4 low frequency current is supplied from a transformer 42 by way of electrode rollers 34, 35, which are staggered in the feed direction of the sections 20, 20'. The rollers 34 and 35 are adjustable in feed direction and also in relation to each other, according to the dimensions c, d. This adjustability has the purpose that, when using low frequency welding current, and when the fold flange tubes are unsymmetrical, the problem arises of uniformly heating the two butting branches. When a U-section branch having a fold flange lies opposite another branch having no such flange, the branch of the U-section with fold flange would remain cooler than the branch without fold flange. The adjustability of the current supply rollers makes it possible to exclude differential heating.

FIGS. 5 and 6 show a preferred embodiment of the welding device using high frequency current supplied through sliding contacts 36 and 37. Numerals 38 and 39 denote pressure rollers, numeral 40 straddling rollers.

According to FIGS. 7 and 8, the welding current is supplied by way of an induction coil 41 surrounding the section at an even distance, which induces an adequate current in component sections 20 and 20', the circuit being closed by the butting branch edges which are thereby heated and joined. Numerals 38 and 39 again denote the pressure rollers and numeral 40 the straddling rollers.

I claim:

1. An apparatus for producing fold flange tubes comprising two series of shape rolling stands, each series of shape rolling stands adapted to form a component section from continuously fed strip stock so that each formed component section will have projecting edges and at least one fold flange, said two series of shape rolling stands being arranged in horizontally staggered relationship and at different levels in the vertical plane, means for vertically displacing said component sections relative to each other to bring the respective projecting edges of each component section into contact with each other, and welding means for butt-welding the edges of said component sections which are in contact.

2. An apparatus as set forth in claim 1 wherein said welding means comprises a low frequency power supply and a plurality of electrode rollers, the electrode rollers positioned in horizontally staggered relationship and being adjustable in the feed direction and in relation to each other.

3. An apparatus as set forth in claim 1 wherein said welding means comprises a high frequency power supply and a plurality of sliding contacts, the sliding contacts adapted to slidingly engage the projecting edges of the component sections.

PO-1050
(5/69)

UNITED STATES PATENT OFFICE
CERTIFICATE OF CORRECTION

Patent No. 3,603,761        Dated September 7, 1971

Inventor(s)    Alfred Wogerbauer

It is certified that error appears in the above-identified patent and that said Letters Patent are hereby corrected as shown below:

Column 1, line 74, add --shaping-- prior to "rolls".
Column 2, line 65, "and at least one fold flange," should read --and at least one of the component sections will have at least one fold flange,--.

Signed and sealed this 21st day of March 1972.

(SEAL)
Attest:

EDWARD M. FLETCHER, JR.               ROBERT GOTTSCHALK
Attesting Officer                    Commissioner of Patents